US012483407B2

(12) United States Patent
Liu et al.

(10) Patent No.: US 12,483,407 B2
(45) Date of Patent: Nov. 25, 2025

(54) NON-FUNGIBLE TOKEN REGISTRATION AND VERIFICATION METHODS

(71) Applicant: INTERNATIONAL BUSINESS MACHINES CORPORATION, Armonk, NY (US)

(72) Inventors: Su Liu, Austin, TX (US); Yu Zhu, Beijing (CN); Peng Hui Jiang, Beijing (CN); Guang Han Sui, Beijing (CN); Jun Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 18/331,921

(22) Filed: Jun. 8, 2023

(65) Prior Publication Data
US 2024/0413998 A1 Dec. 12, 2024

(51) Int. Cl.
| | | |
|---|---|---|
| H04L 9/32 | (2006.01) | |
| G06T 3/40 | (2024.01) | |
| G06T 5/70 | (2024.01) | |
| G06V 10/44 | (2022.01) | |
| G06V 10/56 | (2022.01) | |
| G06V 10/74 | (2022.01) | |
| G06V 10/764 | (2022.01) | |

(52) U.S. Cl.
CPC .............. *H04L 9/3213* (2013.01); *G06T 3/40* (2013.01); *G06T 5/70* (2024.01); *G06V 10/44* (2022.01);
(Continued)

(58) Field of Classification Search
None
See application file for complete search history.

(56) References Cited

U.S. PATENT DOCUMENTS

| | | |
|---|---|---|
| 10,505,726 B1 | 12/2019 | Andon et al. |
| 10,778,438 B2 | 9/2020 | Shi et al. |
| | (Continued) | |

FOREIGN PATENT DOCUMENTS

| | | |
|---|---|---|
| CN | 114359590 A | 4/2022 |
| KR | 102410669 B1 | 6/2022 |
| | (Continued) | |

OTHER PUBLICATIONS

Temmermans, F. et al., "A Media Security Framework Inspired by Emerging Challenges in Fake Media and NFT", Proceedings of SPIE 12138, Optics, Photonics and Digital Technologies for Imaging Applications VII, 121380P (2022), 7 pgs.
(Continued)

*Primary Examiner* — Randolph I Chu
(74) *Attorney, Agent, or Firm* — CHIP LAW GROUP

(57) ABSTRACT

A method and system for registering images as non-fungible token images include a non-fungible token verifier verifying that an image has not been registered as a registered non-fungible token. Once the image is verified, an object recognizer recognizes objects of the image that are classified into a object queue. A characteristic extractor then extracts one or more characteristics of the queued objects. A non-fungible token denormalizer then denormalizes the image into one or more denormalized images each having denormalization attributes. A uniqueness purifier then inspects objects of each of the denormalized images for characteristics extracted from objects in the queue, where matching characteristics between the objects of the denormalized images and objects of the image define unique parameters. Non-fungible token register then registers the image as a unique non-fungible token image. A non-fungible token verification method is carried out along with, or independent of, the non-fungible token registration method.

20 Claims, 10 Drawing Sheets

(52) U.S. Cl.
CPC ............ *G06V 10/56* (2022.01); *G06V 10/761* (2022.01); *G06V 10/764* (2022.01); *G06V 2201/07* (2022.01)

(56) References Cited

U.S. PATENT DOCUMENTS

| | | | |
|---|---|---|---|
| 10,936,580 B2 | 3/2021 | Shi et al. | |
| 11,120,537 B2 | 9/2021 | Liu et al. | |
| 11,605,062 B2* | 3/2023 | Prakash | G06Q 20/3224 |
| 11,985,253 B2* | 5/2024 | Milam | H04L 63/12 |
| 12,259,962 B1* | 3/2025 | Warnick | G06F 21/45 |
| 2021/0256070 A1 | 8/2021 | Tran | |
| 2022/0366061 A1* | 11/2022 | Spivack | H04L 9/3271 |
| 2022/0406419 A1* | 12/2022 | Kruger | G16H 10/60 |
| 2023/0043095 A1* | 2/2023 | Milam | H04L 9/3247 |
| 2023/0308276 A1* | 9/2023 | Bathen | H04L 9/3236 |
| 2023/0334569 A1* | 10/2023 | Maurer | G06Q 20/3678 |
| 2023/0362138 A1* | 11/2023 | Kotlarz | H04L 63/0428 |
| 2023/0396442 A1* | 12/2023 | Meyers | G07F 17/3241 |
| 2024/0143713 A1* | 5/2024 | Schei | G06F 21/32 |
| 2024/0256741 A1* | 8/2024 | Emanuel | G06V 10/761 |
| 2024/0291665 A1* | 8/2024 | Seo | G06V 20/95 |
| 2024/0303379 A1* | 9/2024 | Yeo | H04L 9/3213 |
| 2024/0323019 A1* | 9/2024 | Trehan | H04L 9/3239 |
| 2024/0394678 A1* | 11/2024 | Lohar | G06Q 20/389 |
| 2024/0413998 A1* | 12/2024 | Liu | G06T 5/70 |

FOREIGN PATENT DOCUMENTS

| | | |
|---|---|---|
| KR | 102445134 B1 | 9/2022 |
| KR | 102457034 B1 | 10/2022 |

OTHER PUBLICATIONS

Parmar, D. "Challenges and Risks Associated with NFTs", Geekflare (2022), 10 pgs.

Ferrill, E. et al., "Demystifying NFTs: intellectual property protections with design patents", Reuters (2022), 12 pgs.

Mojtaba, S. et al., "Patents and intellectual property assets as non-fungible tokens; key technologies and challenges", Nature Scientific Reports (2022), 13 pgs.

Gottsegen, W., "Right-Clickers" begone!, CoinDesk (2023), 7 pgs.

Murphy, J. "Deep Learning Frameworks: A Survey of TensorFlow, Torch, Theano, Caffe, Neon, and the IBM Machine Learning Stack", downloaded Dec. 2, 2023 from, https://www.microway.com/hpc-tech-tips/deep-learning-frameworks-survey-tensorflow-torch-theano-caffe-neon-ibm-machine-learning-stack (2016), 6 pgs.

Crovy, S. et a., "ERC-721 Non-Fungible Token Standard", downloaded Dec. 2, 2023 from, https://ethereum.org/en/developers/docs/standards/tokens/erc-721, 6 pgs.

Authour Unknown, "Find Duplicated and Modified NFT Images with New NFT Search APIs", downloaded Dec. 2, 2023 from, https://thehive.ai/blog/find-duplicated-and-modified-nft-images-with-new-nft-search-apis#:~:text=To%20quantify%20visual%20similarity%20between,duplicate%20of%20the%20matching%20image, 5 pgs.

Authour Unknown, "How do I search for NFTs?", downloaded Dec. 2, 2023 from, https://support.opensea.io/hc/en-us/articles/1500003245962-How-do-I-search-for-NFTs, 5 pgs.

Authour Unknown, "What are NFT standards and how to choose one?", downloaded Dec. 2, 2023 from https://docs.nftstars.app/nft-stars/guides/what-are-nft-standards-and-how-to-choose-one (2021), 11 pgs.

LCX Team, "How to Verify NFT Authenticity" downloaded Dec. 2, 2023 from, https://www.lcx.com/how-to-verify-nft-authenticity, 4 pgs.

* cited by examiner

NON-FUNGIBLE TOKEN REGISTRATION AND VERIFICATION METHODS

BACKGROUND

Technical Field

The present disclosure generally relates to methods and systems for registration and verification of non-fungible tokens, and more particularly, to methods and systems for registration and verification of non-fungible token images using object recognition and comparison.

Description of the Related Art

A non-fungible token, or NFT, is a record on a blockchain that is associated with a particular digital or physical asset. Specifically, the ownership of a non-fungible token is recorded in the blockchain and can be transferred by the owner, which allows non-fungible tokens to be sold and traded. Non-fungible tokens can be created by anyone and requires little to no coding experience to create. They typically include references to digital files such as photos, videos, and audio. In addition, non-fungible tokens provide a public certificate of authenticity or proof of ownership to the owner, or owners, of the non-fungible token.

The growing popularity and novelty of non-fungible tokens has led to individuals paying tens of millions of dollars for certain non-fungible tokens. With the dramatic increase in funds being allocated to the non-fungible token market, light is being shed on non-fungible token security risks and protection. Protection of an original non-fungible token is a challenge.

SUMMARY

According to an embodiment of the present disclosure, a method for registering an image as a non-fungible token using a non-fungible token graphical user interface (GUI); a non-fungible token verifier; an object recognizer including a characteristic extractor; and a non-fungible token denormalizer including a uniqueness purifier, a metadata creator, and a non-fungible token register are utilized to carry out the method. The method includes receiving, by the non-fungible token GUI, the image having one or more attributes. Once the image is received by the non-fungible token GUI as a non-fungible token image registration request, the non-fungible token verifier verifies that the image has not been registered as a registered non-fungible token image. The object recognizer then recognizes one or more objects of the image that are classified into a prioritized object queue according to non-fungible token criteria. The characteristic extractor then extracts one or more characteristics of at least one of the one or more objects in the prioritized object queue.

Once the characteristics are extracted by the characteristic extractor, the non-fungible token denormalizer then denormalizes the image into one or more denormalized images, where each of the one or more denormalized images includes one or more denormalization attributes different than the one or more attributes of the image. The uniqueness purifier then inspects one or more objects of each of the one or more denormalized images for the one or more extracted characteristics of at least one of the one or more objects in the prioritized object queue, where characteristics of each of the one or more objects of each of the one or more denormalized images matching the one or more extracted characteristics defines a unique parameter.

The metadata creator then creates metadata for the image including information relating to each of the one or more objects of the image in the prioritized object queue and each of the one or more objects of the one or more denormalized images in the prioritized object queue having the unique parameter. The image is then registered as a unique non-fungible token image on the non-fungible token register. The method is advantageous in that the impact on the service level of the metaverse is very low, which leads to the saving of computational resources.

In one embodiment, which can be combined with the previous embodiment, the image is a frame of a video file.

In another embodiment, which can be combined with the previous embodiments, verifying includes additional process steps. A non-fungible token normalizer normalizes the image. A non-fungible token search agent then searches a registered non-fungible token database for the image, where the non-fungible token search agent does not return any registered non-fungible token images similar to the image.

In another embodiment, which can be combined with the previous embodiments, verifying includes additional process steps. A non-fungible token normalizer normalizes the image. A non-fungible token search agent then searches a registered non-fungible token database for the image, where the non-fungible token search agent returns one or more registered non-fungible token images similar to the image. The object recognizer then selects one or more objects of each of the one or more registered non-fungible token images from the registered non-fungible token database, where each of the one or more objects of each of the one or more registered non-fungible token images comprise one or more registered characteristics. The uniqueness purifier then inspects the image for the one or more objects of each of the one or more registered non-fungible token images, where the one or more objects of the image match the one or more objects of at least one of the one or more registered non-fungible token images. The characteristic extractor then extracts one or more characteristics of the one or more objects of the image. The non-fungible token comparison module then compares the one or more extracted characteristics of the one or more objects of the image to each of the one or more registered characteristics of the matched objects of the one or more registered non-fungible token images. The non-fungible token comparison module then confirms the one or more extracted characteristics of the one or more objects of the image as the one or more registered characteristics of the matched objects of the one or more registered non-fungible token images, where the confirming verifies the image as a variant of at least one of the one or more returned non-fungible token images.

In another embodiment, which can be combined with the previous embodiments, the denormalizing includes alteration of the image with respect to at least one of size, compression format, length ratio, width ratio, length and width ratio, color, three-dimensional rotation, or partial blurring.

In another embodiment, which can be combined with the previous embodiments, the registration method further includes defining a frame for supporting the registration of the image as a non-fungible token image.

In another embodiment, which can be combined with the previous embodiments, the registration method further includes defining a data structure for saving and tracking each of the unique parameters.

In another embodiment, which can be combined with the previous embodiments, the unique parameters comprise a set of variables including ImageID, ImageObjectList, and one or more object characteristics. The ImageID variable represents an image identification element (e.g., a variable). The ImageObjectList variable represents a list of image objects relative to at least one of an image, a denormalized image, or a normalized image. In another embodiment, which can be combined with the previous embodiments, the unique parameters comprise/represent at least one of a number of objects in an image, the types (for example, shapes) of objects (for example, triangle, pentagon, cylinder, etc.), or the characteristics of each objects (for example, coordinates of corners of a triangle having the coordinates $C_1(x_1,y_1)$, $C_2(x_2,y_2)$, $C_3(x_3,y_3)$).

According to an embodiment of the present disclosure, a method for verifying an image as a non-fungible token image using a non-fungible token verifier including a non-fungible token application programming interface (API), a non-fungible token verification engine, a non-fungible token normalizer, and a non-fungible token search agent; an object recognizer including a characteristic extractor and a non-fungible token comparison module; and a non-fungible token denormalizer including a uniqueness purifier are utilized to carry out the method. The method includes receiving, by the non-fungible token API and the non-fungible token verification engine, a request for verification of the image as a non-fungible token image. Once the request for verification is received by the non-fungible token API and the non-fungible token verification engine, the image is normalized by the non-fungible token normalizer. The non-fungible token search agent then searches a registered non-fungible token database for the image, where the non-fungible token search agent returns one or more registered non-fungible token images similar to the image. The object recognizer then selects one or more objects of one or more returned non-fungible token images from the registered non-fungible token database, where each of the one or more objects of each of the one or more registered non-fungible token images include one or more registered characteristics.

Once the one or more objects are selected by the object recognizer, the uniqueness purifier inspects the image for the one or more objects of the one or more returned non-fungible token images, where the one or more objects of the image match the one or more objects of at least one of the one or more registered non-fungible token images. The characteristic extractor then extracts one or more characteristics of the one or more objects of the image. The non-fungible token comparison module then compares the one or more extracted characteristics of the one or more objects of the image to each of the one or more registered characteristics of the matched objects of the one or more registered non-fungible token images. The method is advantageous in that the methodology can be applied to the verification of copywritten images.

In one embodiment, which can be combined with the previous embodiment, the image is a frame of a video file.

In another embodiment, which can be combined with the previous embodiments, verifying includes an additional process step. The non-fungible token comparison module confirms the one or more extracted characteristics of the one or more objects of the image as the one or more registered characteristics of the matched objects of the one or more registered non-fungible token images, where the confirming verifies the image as a variant of at least one of the one or more returned non-fungible token images.

In another embodiment, which can be combined with the previous embodiments, the verification method further includes defining a frame for supporting the verification of the image as a non-fungible token image. The frame, in relation to the verification method, is advantageous in that it provides easy detection of related images.

According to an embodiment of the present disclosure, a computing system is provided. There is a processor, a network module coupled to the processor to enable communication over a network, a non-transitory computer-readable storage device coupled to the processor, an image non-fungible token registration and verification (INRV) manager module coupled to the network module, and a non-fungible token graphical user interface coupled to the processor. A non-fungible token verifier is coupled to the processor, where the non-fungible token verifier includes a non-fungible token application programming interface, a non-fungible token verification engine, a non-fungible token normalizer, and a non-fungible token search agent. An object recognizer is coupled to the processor, where the object recognizer includes a characteristic extractor and a non-fungible token comparison module. A non-fungible token denormalizer is coupled to the processor, where the non-fungible token denormalizer includes a uniqueness purifier, a metadata creator, and a non-fungible token register. Program instructions are stored on the non-transitory computer-readable storage device for execution by the processor via the memory.

Computing system, in conjunction with the program instructions, is configured to perform a non-fungible token registration method. The non-fungible token graphical user interface receives an image including one or more attributes. Once the non-fungible token graphical user interface receives the image, the non-fungible token then verifier verifies that the image has not been registered as a registered non-fungible token image. The object recognizer then recognizes one or more objects of the image, where the one or more objects of the image are classified into a prioritized object queue according to non-fungible token criteria. The characteristic extractor then extracts one or more characteristics of at least one of the one or more objects in the prioritized object queue. The non-fungible token denormalizer then denormalizes the image into one or more denormalized images, where each of the one or more denormalized images includes one or more denormalization attributes different than the one or more attributes of the image. The uniqueness purifier then inspects one or more objects of each of the one or more denormalized images for the one or more extracted characteristics of at least one of the one or more objects in the prioritized object queue, where characteristics of each of the one or more objects of each of the one or more denormalized images matching the one or more extracted characteristics defines a unique parameter. The metadata creator then creates metadata for the image including information relating to each of the one or more objects of the image in the prioritized object queue and each of the one or more objects of the one or more denormalized images in the prioritized object queue having the unique parameter. The image is then registered as a unique non-fungible token image on the non-fungible token register. The computing system is advantageous in that the computing system has a very low impact on the service level of the metaverse, which leads to the saving of computational resources.

In one embodiment, which can be combined with the previous embodiment, the image is a frame of a video file.

In another embodiment, which can be combined with the previous embodiments, the denormalizing includes alteration of the image with respect to at least one of size, compression format, length ratio, width ratio, length and width ratio, color, three-dimensional rotation, or partial blurring.

In another embodiment, which can be combined with the previous embodiments, the computing system, in conjunction with the program instructions, is additionally configured to perform a non-fungible token verification method. The non-fungible token application programming interface and the non-fungible token verification engine receive a request for verification of an image as a non-fungible token image. Once the request for verification is received by the non-fungible token application program interface and the non-fungible token verification engine, the non-fungible token normalizer then normalizes the image. The non-fungible token search agent then searches a registered non-fungible token database for the image, where the non-fungible token search agent returns one or more registered non-fungible token images similar to the image. The object recognizer then selects one or more objects of one or more returned non-fungible token images from the registered non-fungible token database, where each of the one or more objects of each of the one or more registered non-fungible token images comprise one or more registered characteristics. The uniqueness purifier then inspects the image for the one or more objects of the one or more returned non-fungible token images, where the one or more objects of the image match the one or more objects of at least one of the one or more registered non-fungible token images. The characteristic extractor then extracts one or more characteristics of the one or more objects of the image. The non-fungible token comparison module then compares the one or more extracted characteristics of the one or more objects of the image to each of the one or more registered characteristics of the matched objects of the one or more registered non-fungible token images.

In another embodiment, which can be combined with the previous embodiments, verifying includes an additional step. The non-fungible token comparison module confirms the one or more extracted characteristics of the one or more objects of the image as the one or more registered characteristics of the matched objects of the one or more registered non-fungible token images, where the confirming verifies the image as a variant of at least one of the one or more returned non-fungible token images.

In another embodiment, which can be combined with the previous embodiments, verifying includes additional process steps. A non-fungible token normalizer normalizes the image. A non-fungible token search agent then searches a registered non-fungible token database for the image, where the non-fungible token search agent does not return any registered non-fungible token images similar to the image.

In another embodiment, which can be combined with the previous embodiments, computing system, in conjunction with the program instructions, is further configured to define a frame for supporting at least one of: the registration of the image as the non-fungible token image or the verification of the image as the non-fungible token image.

In another embodiment, which can be combined with the previous embodiments, computing system, in conjunction with the program instructions, is further configured to define a data structure for saving and tracking each of the unique parameters.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

Figure 1:
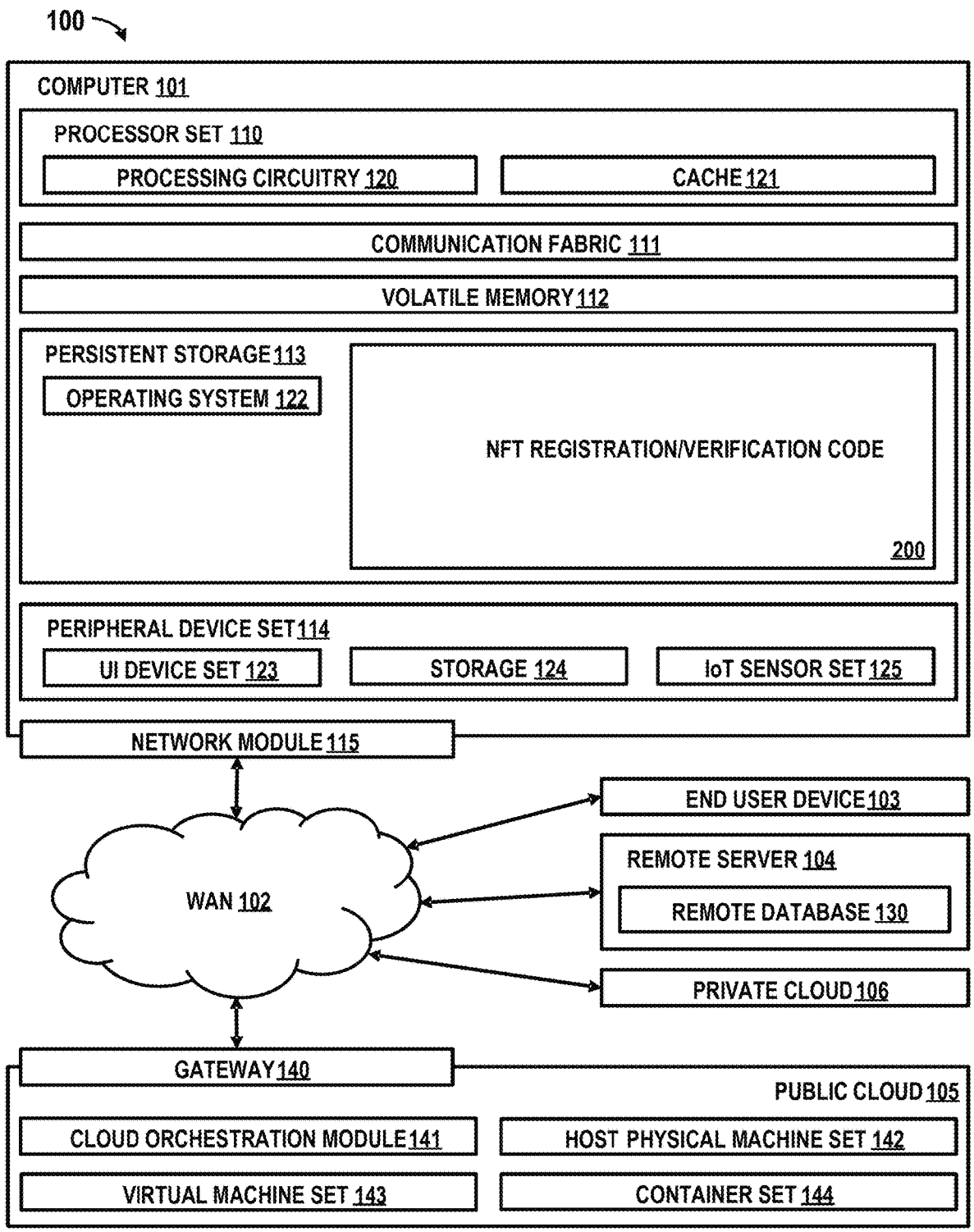
FIG. 1 is a functional block diagram illustration of a computing environment that can communicate with various networked components, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustration of a computing environment 100 that can communicate with various networked components, such as the cloud, a policy data source, etc. In particular, FIG. 1 illustrates a computing environment 100, as may be used to implement a component, such as, for example, an image non-fungible token registration and verification (INRV) manager module 430, a non-fungible token graphical user interface 440, a non-fungible token verifier 450, an object recognizer 460, and a non-fungible token denormalizer 470.

Computing environment 100 includes an example of an environment for the execution of at least some of the computer code involved in performing the inventive methods, such as NFT registration/verification code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The present disclosure generally relates to methods for registering and verifying an image as a non-fungible token image. By virtue of the concepts discussed herein, denormalization of an image and characteristic extraction of characteristics of objects classified into a prioritized object queue of the image and the denormalized images are utilized to provide registration of one or more images as non-fungible token images. Additionally, normalization of an image and characteristic extraction and comparison of characteristics of objects of the image and search returned non-fungible token images are utilized to provide verification of one or more images as non-fungible token images.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

Accordingly, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

Figure 2:
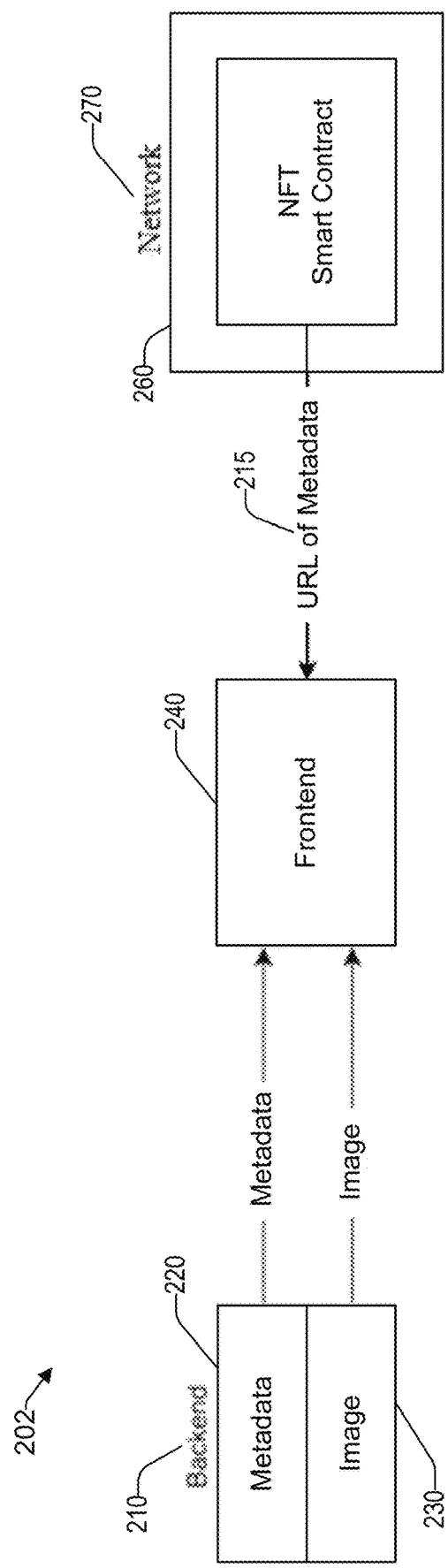
FIG. 2 is a simple flowchart showing a conventional structure of a non-fungible token.

Reference is now made to FIG. 2, which is a simple flowchart 202 showing a conventional structure of a non-fungible token. A backend 210 stores an image 230 and metadata 220 of the image 230. The image 230 and associated metadata 220 are shared between backend 210 and a frontend 240. A non-fungible token smart contract 260 including a metadata URL 215 is stored on blockchain network 270 (such as, for example, the Ethereum network). The metadata URL 215 is shared between the non-fungible token smart contract 260 and the frontend 240.

Figure 3A:
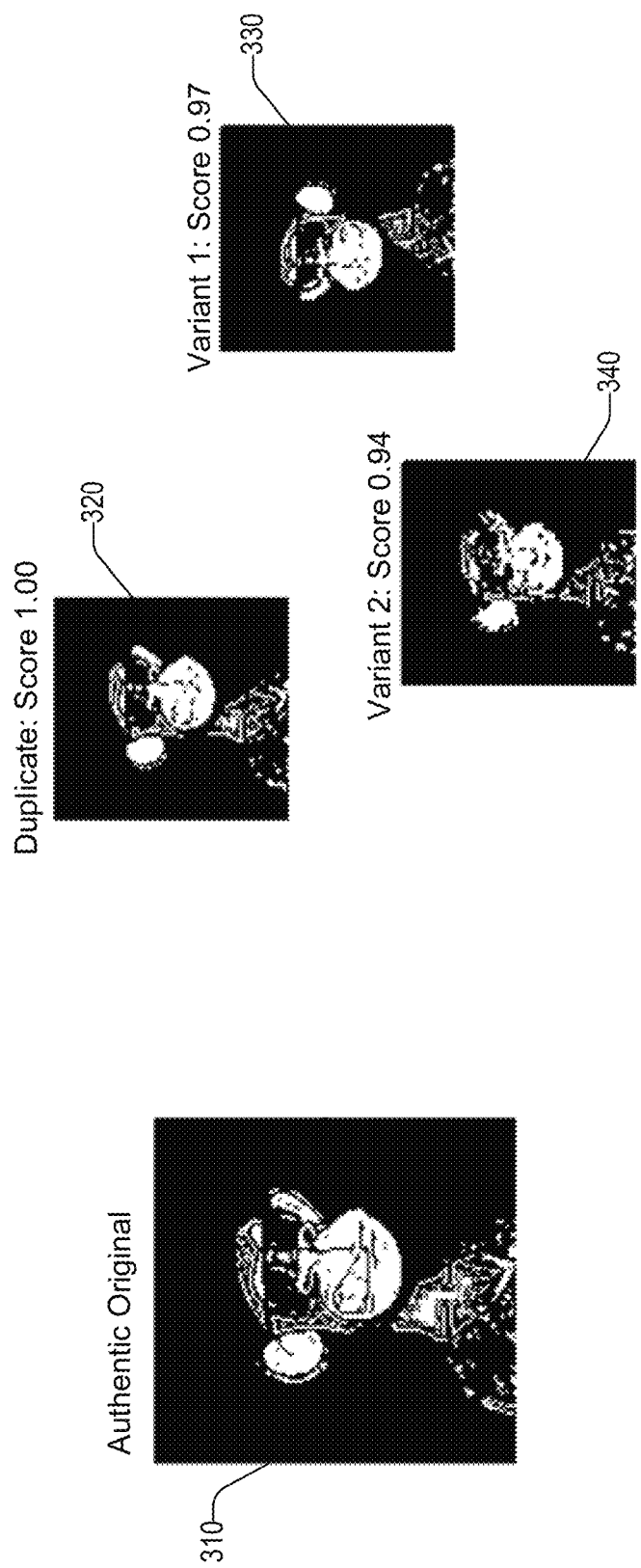
FIG. 3A illustrates an example non-fungible token and its associated image-based variants, consistent with an illustrative embodiment.

Reference is now made to FIG. 3A, which illustrates an example non-fungible token image 310 and its associated image-based variants 320, 330, and 340, consistent with an illustrative embodiment. As shown, a first image-based variant 320 is presented as an exact duplicate of the exemplary non-fungible token image 310. A second image-based variant 330 is presented as a reflected duplicate of the exemplary non-fungible token image 310. A third image-based variant 340 is presented as a pixelated duplicate of the exemplary non-fungible token image 310. In a conventional non-fungible token ranking system, numbers can be assigned to designate the similarity of a variant 320, 330, and 340 with the exemplary non-fungible token image 310 (where the exemplary non-fungible token image 310 is assigned a 1.00 and variants 320, 330, and 340 are assigned a 1.00 or less). For the first image-based variant 320, the conventional ranking system assigned a score of 1.00, indicating that the first image-based variant 320 is an exact duplicate of the exemplary non-fungible token image 310. For the second image-based variant 330, the conventional ranking system assigned a score of 0.97, indicating that the second image-based variant 330 is a modified version of the exemplary non-fungible token image 310. For the third image-based variant 340, the conventional ranking system assigned a score of 0.94, indicating that the third image-based variant 340 is also a modified version of the exemplary non-fungible token image 310. It is noted that the exemplary non-fungible token image 310 and the associated image-based variants 320, 330, and 340 are all registered as non-fungible tokens using conventional non-fungible token registration methods.

Figure 3B:
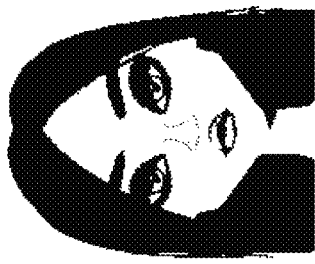
FIG. 3B illustrates an example image embodied in a plurality of file-based non-fungible token variants, consistent with an illustrative embodiment.
Figure 3B:
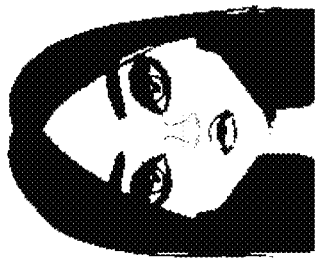
Figure 3B:
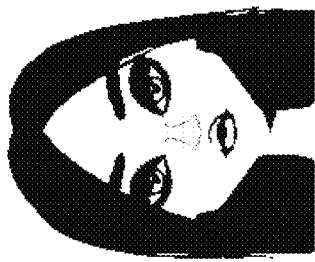

Reference is now made to FIG. 3B, which illustrates an example image embodied in a plurality of file-based non-fungible token variants 360, 370, and 380, consistent with an illustrative embodiment. As shown, exemplary image is embodied in a first file-based non-fungible token variant 360 having a PNG file format. Example image is embodied in a second file-based non-fungible token variant 370 having a JPG file format. Example image is embodied in a third file-based non-fungible token variant 380 having a GIF file format. It is noted that the first, second, and third file-based non-fungible token variants 360, 370, and 380 of example image are each capable of being registered as non-fungible tokens (representing the same example image in each) with conventional non-fungible token registration methods.

Example Architecture

Figure 4:
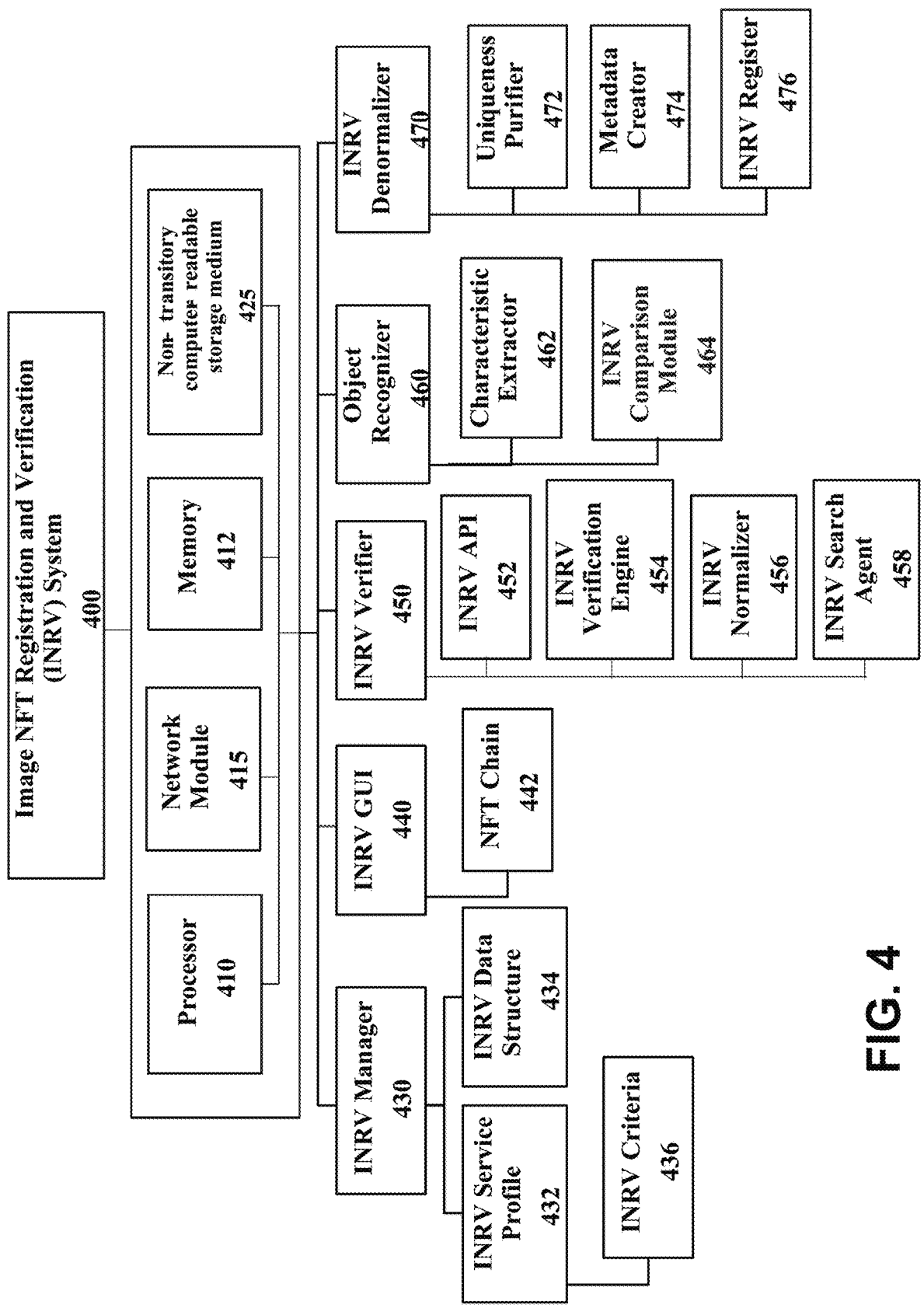
FIG. 4 presents a computing system for registering and verifying image non-fungible tokens, consistent with an illustrative embodiment.

Reference is now made to FIG. 4, which presents a computing system 400 for registering and verifying image non-fungible tokens, consistent with an illustrative embodiment. For purposes of this disclosure, computing system 400 can be alternately referred to as an Image NFT Registration and Verification (INRV) System 400. As shown, network module 415 (similar to the network module 115 of FIG. 1) provides coupling between various components of computing system 400 so that image data of an image is shared between the components that are configured to register and verify the image as a non-fungible token (or verify that the image is not a non-fungible token) and include INRV manager module 430, INRV GUI 440 (alternatively referred to as non-fungible token graphical user interface/GUI 440), INRV verifier 450 (alternatively referred to as non-fungible token verifier 450), object recognizer 460, and INRV denormalizer 470 (alternatively referred to as non-fungible token denormalizer 470). Network module 415 is coupled to a processor 410 to enable the processor communication over a network established by network module 415. Additionally, a non-transitory computer-readable storage device 425 is coupled to the processor 410.

INRV manager module 430 is coupled to network module 415 to enable storage and distribution of image data to the other components of computing system 400. INRV manager 430 includes an INRV service profile 432, an INRV data structure 434, and INRV criteria 436.

Non-fungible token GUI 440 is coupled to processor 410 to enable communication between computing system 400 and a user of computing system 400. Non-fungible token GUI 440 is connected, via network module 415, to one or more NFT chains (or blockchains) 442 to enable a user to access information stored on the NFT chains 442.

Non-fungible token verifier 450 is coupled to processor 410 to enable analysis of image data relative to an image. Non-fungible token verifier 450 includes an INRV API 452 (alternatively referred to as non-fungible token application programming interface/API 452), INRV verification engine 454 (alternatively referred to as non-fungible token verification engine 454), INRV normalizer 456 (alternatively referred to as non-fungible token normalizer 456), and INRV search agent 458 (alternatively referred to as non-fungible token search agent 458).

Object recognizer 460 is coupled to processor 410 to enable additional analysis of image data relative to an image. Object recognizer 460 includes characteristic extractor 462 and INRV comparison module 464 (alternatively referred to as non-fungible token comparison module 464).

Non-fungible token denormalizer 470 is coupled to processor 410 to enable alteration and creation of image data relative to an image. Non-fungible token denormalizer 470 includes uniqueness purifier 472, metadata creator 474, and INRV register 476 (alternatively referred to as non-fungible token register 476).

Program instructions (additionally referred to as NFT registration/verification code 200) stored on the non-transitory computer-readable storage device 425 are configured for execution by the processor via a memory 412 (similar to the volatile memory 112 of FIG. 1) coupled to processor 410. The instructions are configured to render computing device 400 capable of performing a number of operations in a method for registering an image as a non-fungible token image (presented similarly in FIG. 8). The method includes receiving, by the non-fungible token GUI 440, the image having one or more attributes. Once the image is received by the non-fungible token GUI 440 as a non-fungible token image registration request, the non-fungible token verifier 450 verifies that the image has not been registered as a registered non-fungible token image. The object recognizer 450 then recognizes one or more objects of the image that are classified into a prioritized object queue according to non-fungible token criteria. The characteristic extractor 462 then extracts one or more characteristics of at least one of the one or more objects in the prioritized object queue.

Once the characteristics are extracted by the characteristic extractor 462, the non-fungible token denormalizer 470 then denormalizes the image into one or more denormalized images, where each of the one or more denormalized images includes one or more denormalization attributes different than the one or more attributes of the image. The uniqueness purifier 472 then inspects one or more objects of each of the one or more denormalized images for the one or more extracted characteristics of at least one of the one or more objects in the prioritized object queue, where characteristics of each of the one or more objects of each of the one or more denormalized images matching the one or more extracted characteristics defines a unique parameter. The metadata creator 474 then creates metadata for the image information relating to each of the one or more objects of the image in the prioritized object queue and each of the one or more objects of the one or more denormalized images in the prioritized object queue having the unique parameter. The image is then registered as a unique non-fungible token image on the non-fungible token register 476. The method is advantageous in that the impact on the service level of the metaverse is very low, which leads to the saving of computational resources.

In an embodiment, the denormalizing includes alteration of the image with respect to at least one of size, compression format, length ratio, width ratio, length and width ratio, color, three-dimensional rotation, or partial blurring. In a further embodiment, any type of retrievable computerized image enhanced methodology may be utilized in order to carry out the denormalizing.

In a further embodiment relating to the registration method, verifying includes additional process steps. Non-fungible token normalizer 456 normalizes the image. Non-fungible token search agent 458 then searches a registered non-fungible token database for the image, where the non-fungible token search agent 458 does not return any registered non-fungible token images similar to the image. If non-fungible token search agent 458 does not return any registered non-fungible token images similar to the image, the image registration methodology can be carried out using the image.

Figure 9:
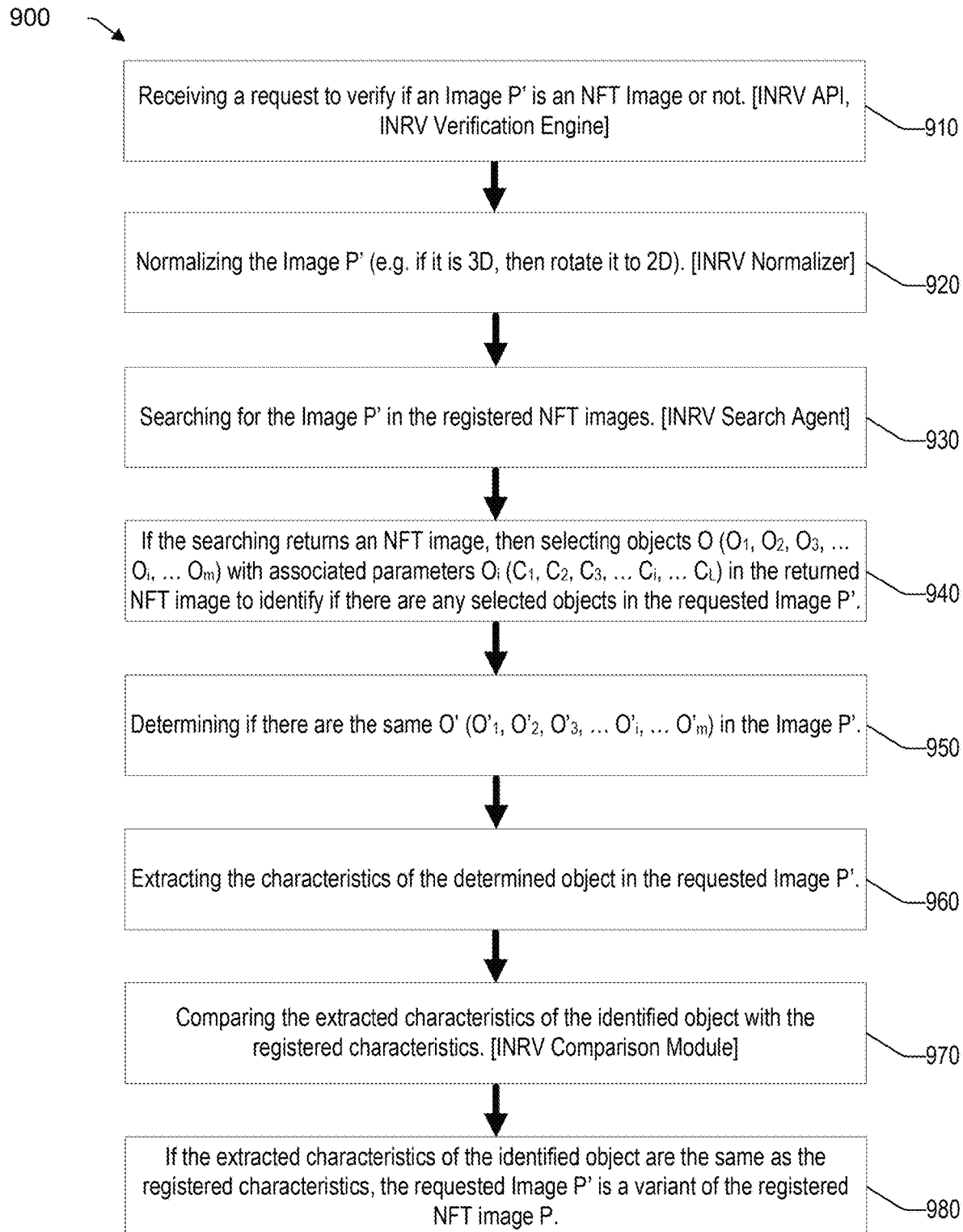
FIG. 9 is a flowchart for a method for verifying an image as a non-fungible token image, consistent with an illustrative embodiment.

In a further embodiment, the instructions are configured to render computing device 400 capable of performing a number of operations in a method for verifying an image as a non-fungible token image (presented similarly in FIG. 9). The method includes receiving, by the non-fungible token API 452 and the non-fungible token verification engine 454, a request for verification of the image as a non-fungible token image. Once the request for verification is received by the non-fungible token API and the non-fungible token verification engine 454, the image is normalized by the non-fungible token normalizer 456. The non-fungible token search agent 458 then searches a registered non-fungible token database for the image, where the non-fungible token search agent returns one or more registered non-fungible token images similar to the image. The object recognizer 460 then selects one or more objects of each of the one or more registered non-fungible token images from the registered non-fungible token database, where each of the one or more objects of each of the one or more registered non-fungible token images comprise one or more registered characteristics.

Once the one or more objects are selected by the object recognizer 460, the uniqueness purifier 472 inspects the image for the one or more objects of each of the one or more registered non-fungible token images, where the one or more objects of the image match the one or more objects of at least one of the one or more registered non-fungible token images. The characteristic extractor 462 then extracts one or more characteristics of the one or more objects of the image. The non-fungible token comparison module 464 then compares the one or more extracted characteristics of the one or more objects of the image to each of the one or more registered characteristics of the matched objects of the one or more registered non-fungible token images. The method is advantageous in that the methodology can be applied to the verification of copywritten images.

In a further embodiment relating to the verification method, non-fungible token comparison module 464 confirms the one or more extracted characteristics of the one or more objects of the image as the one or more registered characteristics of the matched objects of the one or more registered non-fungible token images, where the confirming verifies the image as a variant of at least one of the one or more returned non-fungible token images.

In a further embodiment, computing system 400, in conjunction with the program instructions, is further configured to define a frame for supporting at least one of: the registration of the image as the non-fungible token image or the verification of the image as the non-fungible token image. In an additional embodiment, the frame can include at least one of an INRV manager module 430 (including a graphical user interface), a non-fungible token verification function (where a user can verify if a given image is a non-fungible token or not), or a non-fungible token registration function (where a user can register a new non-fungible token which has never been registered before).

In a further embodiment, computing system 400, in conjunction with the program instructions, is further configured to define a data structure for saving and tracking each of the unique parameters.

According to an embodiment of the present disclosure, a computer program product for registering and verifying an image as a non-fungible token image is provided. The computer program product includes a computer readable storage medium embodying program instructions executable by a processor to cause the processor to perform a plurality of steps. These steps may correlate to any process steps/functions relative to any of FIGS. 5-9. The computer program product, in relation to the registration method, is advantageous in that the impact on the service level of the metaverse is very low, which leads to the saving of computational resources. The computer program product, in relation to the verification method, is advantageous in that the methodology can be applied to the verification of copywritten images.

Figure 5:
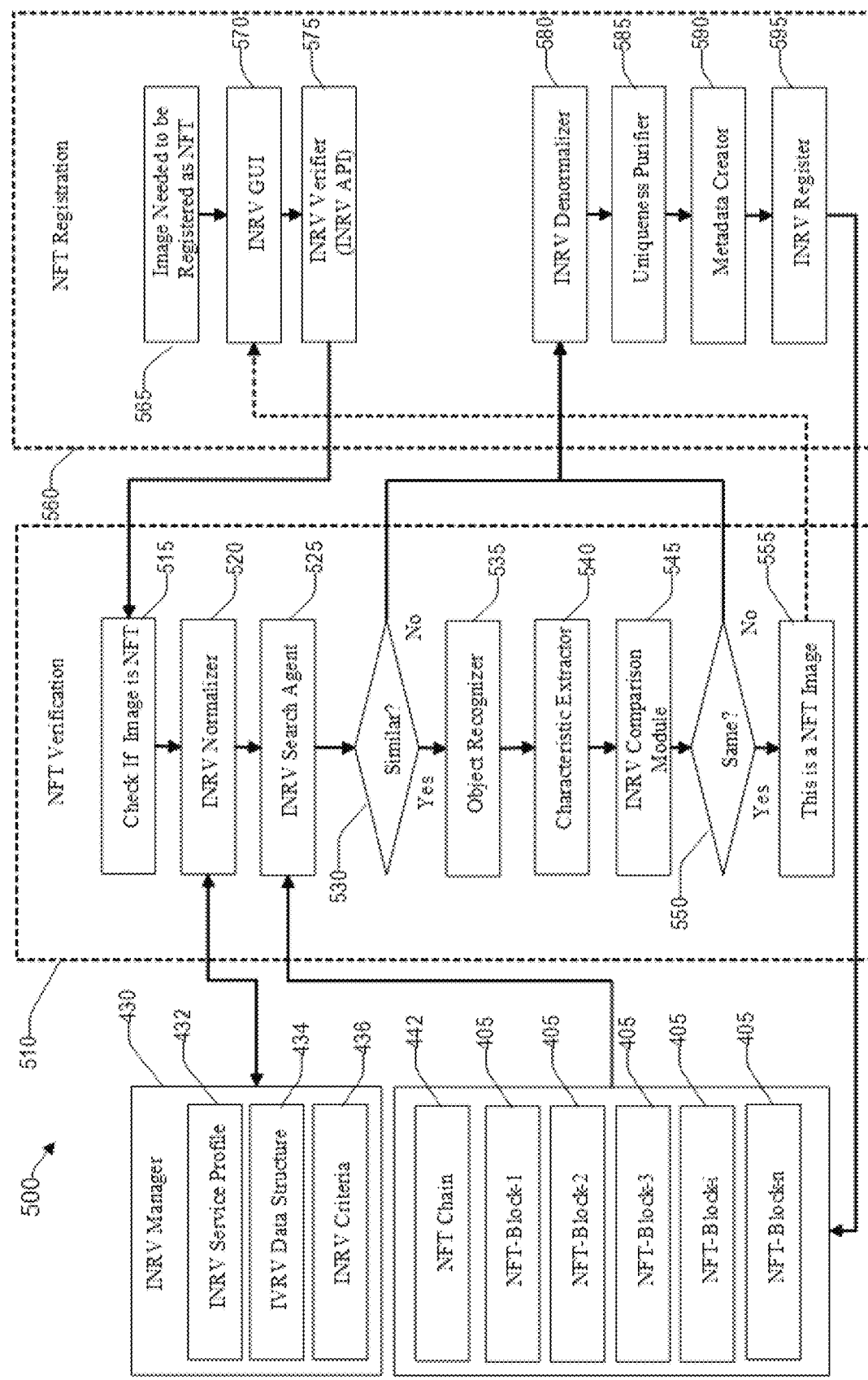
FIG. 5 is a flowchart showing exemplary processes of registering and verifying an image as a non-fungible token image performed in the computing system shown in FIG. 4, consistent with an illustrative embodiment.

Reference is now made to FIG. 5, which is a flowchart 500 showing exemplary processes of registering and verifying an image as a non-fungible token image performed in the computing system 400 shown in FIG. 4, consistent with an illustrative embodiment. For discussion purposes, the flowchart 500 is described with reference to the architecture of environment 100 and computing system 400 of FIGS. 1 and 4. It is noted that there are a number of possible flows depending on a user's preference of computing system 400 performing an image NFT registration (block 510) and/or an image NFT verification (block 560). For example, if a user requests computing system 400 to perform an image NFT verification at block 510 of an image and computing system 400 determines that the image is not a registered non-fungible token image, user may prefer that computing system 400 subsequently perform an image NFT registration at block 560.

As shown, INRV manager module 430 includes INRV service profile 432, INRV data structure 434, and INRV criteria 436. INRV manager module 430, as shown, is coupled to non-fungible token normalizer 456 at block 520. NFT chain 442 includes a plurality of NFT blocks 405, where each block 405 is configured to store, in embodiments, a cryptographic hash of a previous block 405, a timestamp, and transaction data related to a registered non-fungible token image. NFT chain 442 is configured to receive registered non-fungible token image data from non-fungible token register 476 at block 595. NFT chain 442 is configured to supply registered non-fungible token image data to non-fungible token search agent 458 at block 525.

Within block 510, a plurality of blocks 515, 520, 525, 530, 535, 540, 545, 550, and 555 include process steps relating to a method for verifying an image as a non-fungible token image. It is noted that one or more of blocks 515, 520, 525, 530, 535, 540, 545, 550, and 555 are connected to blocks and/or elements of computing system 400 located outside of block 510, implying that process steps or elements of computing system 400 are performed/utilized in conjunction with process steps or elements of computing system 400 not relative to block 510.

At block 515, a non-fungible token verifier 450/non-fungible token application programming interface 452 receives a request for verification of the image as a non-fungible token image. At block 520, a non-fungible token normalizer 456 normalizes the image. To carry out this process, non-fungible token normalizer 456 may perform the normalization operations according to predefined (INRV) criteria through a GUI of INRV manager module 430. In order to verify if an image is a non-fungible token image or not, the image is normalized so that it can be compared. In an embodiment, the criteria includes, but is not limited to: converting a three-dimensional image to a two-dimensional image and changing the length and/or width ratio to a common/standardized ratio (for example, 4:3, 16:9, 3:2, 1:1, etc.). At block 525, a non-fungible token search agent 458 searches a registered non-fungible token database for the image, where the non-fungible token search agent 458 returns one or more registered non-fungible token images similar to the image. As shown, the registered non-fungible token database may be NFT chain 442.

At block 530, if the search by non-fungible token search agent 458 does not return any results (registered/returned non-fungible tokens not similar to the image), then the non-fungible token denormalizer 470 denormalizes the image into one or more denormalized images, starting a portion of a process of registering the image within block 560 (presented subsequently). If the search determined that there were results (one or more registered/returned non-fungible tokens similar to the image), then, at block 535, an object recognizer 460 selects one or more objects of the one or more returned non-fungible token images from the registered non-fungible token database (NFT chain 442), where each of the one or more objects of each of the one or more registered non-fungible token images include one or more registered characteristics.

At block 540, a characteristic extractor 462 extracts one or more characteristics of the one or more objects of the image.

At block 545, a non-fungible token comparison module 464 then compares the one or more extracted characteristics of the one or more objects of the image to each of the one or more registered characteristics of the matched objects of the one or more registered non-fungible token images.

At block 550, the non-fungible token comparison module 464 confirms the one or more extracted characteristics of the one or more objects of the image as the one or more registered characteristics of the matched objects of the one or more registered non-fungible token images or confirms the one or more extracted characteristics of the one or more objects of the image as different than the one or more registered characteristics of the matched objects of the one or more registered non-fungible token images. In the case that the characteristics of each are different, process step(s) associated with block 580 are subsequently performed by computing system 400 (described subsequently).

At block 555, a confirming verifies the image as a variant of at least one of the returned non-fungible token images. If the non-fungible token comparison module 464 confirms that the one or more characteristics of the one or more objects of the image are not different than the one or more characteristics of the one or more objects of at least one of the returned non-fungible token images, then a confirmation that the image is a registered non-fungible token image is sent from the non-fungible token comparison module 464 to the non-fungible token GUI 440 for access by a user. If the non-fungible token comparison module 464 confirms that the one or more characteristics of the one or more objects of the image are different than the one or more characteristics of the one or more objects of at least one of the returned non-fungible token images, then the image data is sent from the non-fungible token comparison module 464 to the non-fungible token denormalizer 470 that denormalizes the image into one or more denormalized images, which starts a portion of a process of registering the image within block 560 (presented subsequently). The method is advantageous in that the methodology can be applied to the verification of copywritten images.

Within block 560, a plurality of blocks 565, 570, 575, 580, 585, 590, and 595 include process steps relating to a method for registering an image as a non-fungible token image. It is noted that one or more of blocks 565, 570, 575, 580, 585, 590, and 595 are connected to blocks and/or elements of computing system 400 located outside of block 560, implying that process steps or elements of computing system 400 are performed/utilized in conjunction with process steps or elements of computing system 400 not relative to block 560.

At block 565, a user input including a request for registration of the image as a non-fungible token image is sent to the non-fungible token GUI 440. At block 570, the non-fungible token GUI 440 receives the request for registration of the image as a non-fungible token image.

At block 575, the non-fungible token verifier 450/non-fungible token application programming interface 452 receives a request for verification of the image as a non-fungible token image from the non-fungible token GUI 440. Once the non-fungible token verifier 450/non-fungible token application programming interface 452 receives the request for verification, the non-fungible token verifier 450/non-fungible token application programming interface 452 verifies that the image has not been registered as a registered non-fungible token image.

Subsequently, process steps found in block 510 can be carried out by computing system 400 in order to perform the verifying. For example, process steps found in blocks 515-530 can be carried out by computing system 400, while process step(s) found in block 580 is performed subsequently (described subsequently). As another example, process steps found in blocks 515-550 can be carried out by computing system 400, while process step(s) found in block 580 is performed subsequently. As a further example, process steps found in blocks 515-555 can be carried out by computing system 400, while process step(s) found in block 570 is performed subsequently.

Once either a search by non-fungible token search agent 458 returns no results (registered/returned non-fungible tokens not similar to the image) at block 530 or a non-fungible token comparison module 464 confirms that the one or more characteristics of the one or more objects of the image are different than the one or more characteristics of the one or more objects of at least one of the returned/registered non-fungible token images, then the non-fungible token denormalizer 470, at block 580, denormalizes the image into one or more denormalized images. Each of the one or more denormalized images includes one or more denormalization attributes different than the one or more attributes of the image.

At block 585, a uniqueness purifier 472 then inspects one or more objects of each of the one or more denormalized images for the one or more extracted characteristics of at least one of the one or more objects in the prioritized object queue, where characteristics of each of the one or more objects of each of the one or more denormalized images matching the one or more extracted characteristics defines a unique parameter.

At block 590, metadata creator 474 then creates metadata for the image including information relating to each of the one or more objects of the image in the prioritized object queue and each of the one or more objects of the one or more denormalized images in the prioritized object queue having the unique parameter.

At block 595, the image is then registered as a unique non-fungible token image on the non-fungible token register 476. Subsequently, identifying information of the image (including the metadata created by metadata creator 474) is provided to NFT chain 442 and stored as one of the plurality of NFT blocks 405, where each block 405 is configured to store, in embodiments, a cryptographic hash of a previous block 405, a timestamp, and transaction data related to a registered non-fungible token image. The method is advantageous in that the impact on the service level of the metaverse is very low, which leads to the saving of computational resources.

In an embodiment, the registration and verification methods each include defining a frame for supporting the registration of the image as the non-fungible token image via INRV manager module 430, INRV service profile 432, and NFT chain 442. In an additional embodiment, the frame can include at least one of an INRV manager module 430 (including a graphical user interface), a non-fungible token verification function (where a user can verify if a given image is a non-fungible token or not), or a non-fungible token registration function (where a user can register a new non-fungible token which has never been registered before).

In a further embodiment, the registration and verification methods each include defining a data structure for saving and tracking each of the unique parameters via INRV data structure 434. In an additional embodiment, the unique parameters comprise a set of variables including ImageID, ImageObjectList, and one or more object characteristics. The ImageID variable represents an image identification element (e.g., variable). The ImageObjectList variable represents a list of image objects relative to at least one of an image, a denormalized image, or a normalized image. In an additional embodiment, the unique parameters comprise/ represent at least one of a number of objects in an image, the types (for example, shapes) of objects (for example, triangle, pentagon, cylinder, etc.), or the characteristics of each objects (for example, coordinates of corners of a triangle having the coordinates $C_1(x_1,y_1)$, $C_2(x_2,y_2)$, $C_3(x_3,y_3)$).

Figure 6:
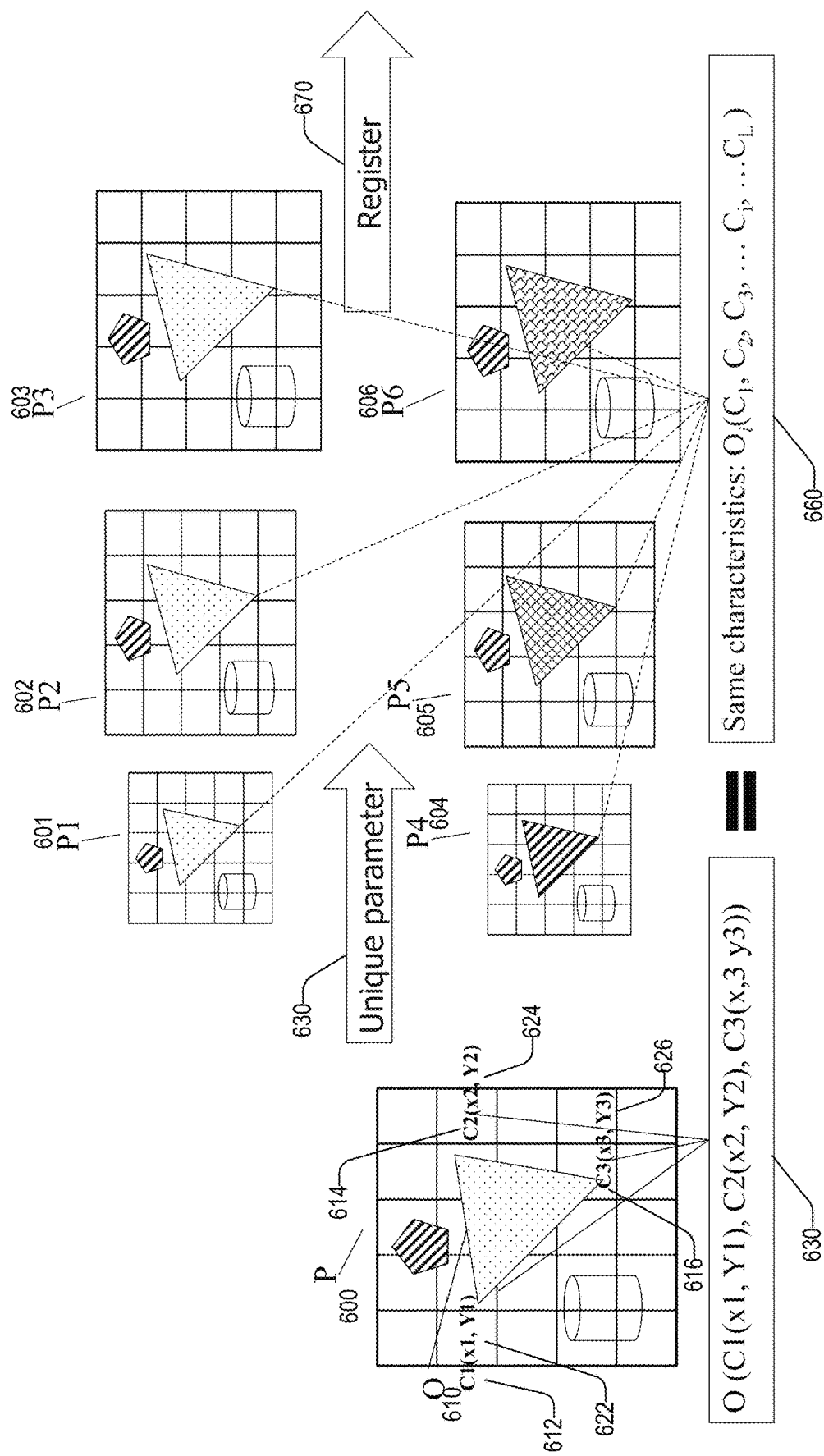
FIG. 6 is a diagram of an image and a plurality of denormalized images resulting from denormalization of the image using the computing system of FIG. 4, consistent with an illustrative embodiment.

Reference is now made to FIG. 6, which is a diagram of an image 600 and a plurality of denormalized images 601, 602, 603, 604, 605, and 606 (P1, P2, P3, P4, P5, and P6) resulting from denormalization of the image using the computing system 400 of FIG. 4, consistent with an illustrative embodiment. As shown, image 600 (to be registered as a non-fungible token), alternatively referred to as P, includes an object 610 having a plurality of characteristics 612 ($C_1$), 614 ($C_2$), and 616 ($C_3$), where each of the plurality of characteristics include unique parameters (representing attributes). As an example (shown in block 640), image P 600 includes an object 610 (blue triangle) having characteristics 612 ($C_1$), 614 ($C_2$), 616 ($C_3$); 616 each of the characteristics include respective unique parameters 622 ($x_1,y_1$), 624 ($x_2,y_2$), 626 ($x_3,y_3$) defining the attributes. Object 610 is summarized as a formula at block 635.

When non-fungible token denormalizer 470 denormalizes image 600, a plurality of denormalized images 601, 602, 603, 604, 605, and 606 is created that each include the same set of characteristics 612 ($C_1$), 614 ($C_2$), and 616 ($C_3$). In relation to denormalization, each set of characteristics 612 ($C_1$), 614 ($C_2$), and 616 ($C_3$) for the denormalized images 601, 602, 603, 604, 605, and 606 can include unique parameters (block 630) that are each unique in relation to each other and to the unique parameters of image 600. As an example, image 600 and the plurality of denormalized images each include object 610 (triangle) with the same characteristics 612 ($C_1$), 614 ($C_2$), 616 ($C_3$) (that make the object 610 a triangle), where the unique parameters of each of the characteristics of the denormalized images 601, 602, 603, 604, 605, and 606 are different in relation to each other and the unique parameters 622 ($x_1,y_1$), 624 ($x_2,y_2$), 626 ($x_3,y_3$) of image 600. As shown, objects 610 in image 600 and denormalized images 601, 602, and 603 each include a shading representing the color blue (color as a unique parameter), while objects 610 in denormalized images 604, 605, 606 each include a shading representing the colors red, yellow, and purple, respectively. An additional observable unique parameter includes the size of each of the denormalized images 601, 602, 603, 604, 605, and 606. As shown, denormalized images 601 and 604 are smaller than image 600, denormalized images 603 and 606 are compressed in relation to image 600, and denormalized images 601 and 604 are stretched and compressed in relation to image 600. At block 660, a formula is presented representing each of the objects 610 of each of the denormalized images 601, 602, 603, 604, 605, and 606; the formula is equivalent to the formula at block 635, showing that the denormalized images 601, 602, 603, 604, 605, and 606 are variants of image 600. Once registered, at block 670, metadata of image 600 can include identifying information relating to denormalized images 601, 602, 603, 604, 605, and 606.

Figure 7:
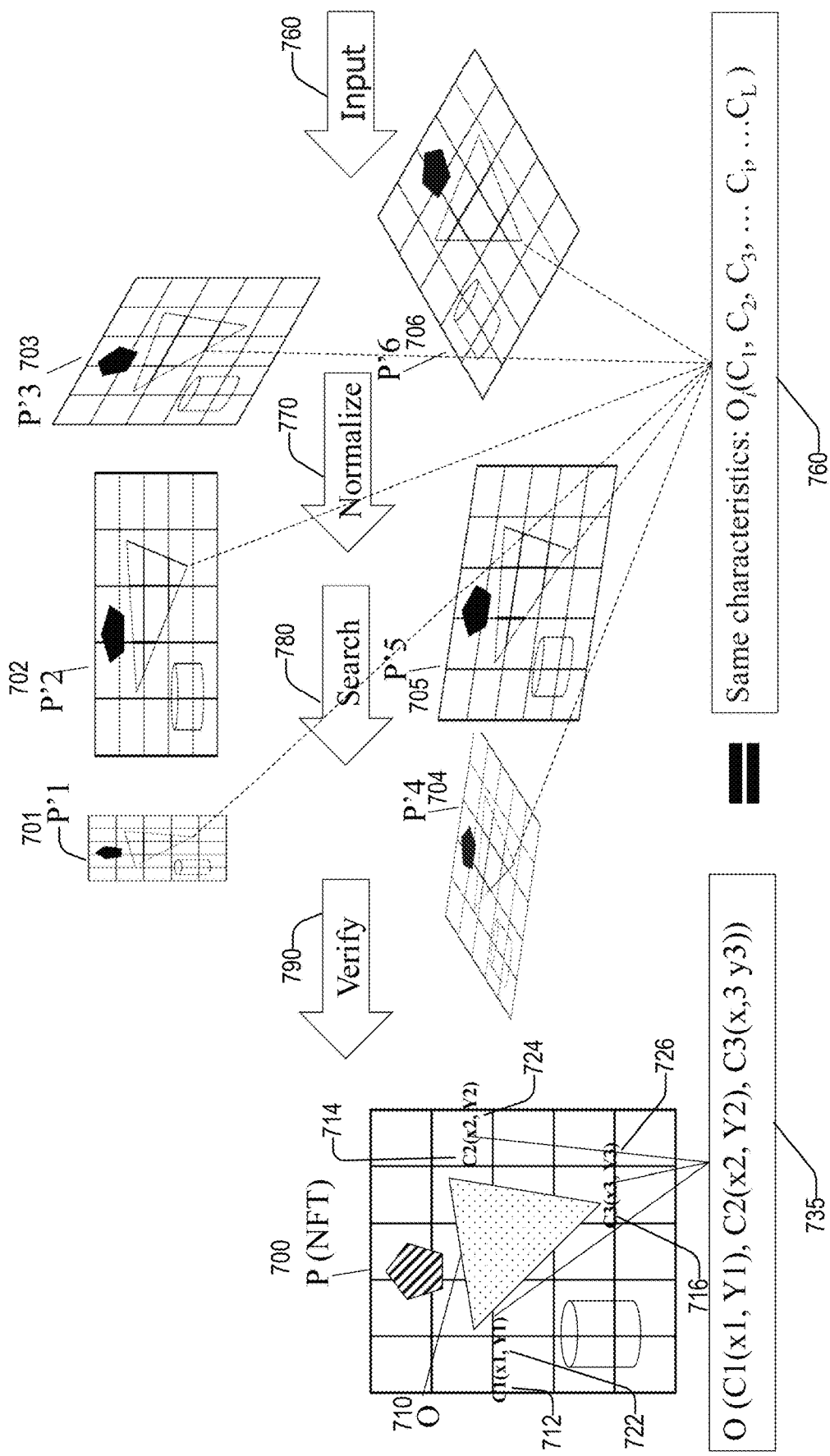
FIG. 7 is a diagram of a registered non-fungible token image and a plurality of images configured to be normalized using the computing system of FIG. 4, consistent with an illustrative embodiment.

Reference is now made to FIG. 7, which is a diagram of a registered non-fungible token image 700 and a plurality of images 701, 702, 703, 704, 705, and 706 (P'1, P'2, P'3, P'4, P'5, and P'6) configured to be normalized using the computing system 400 of FIG. 4, consistent with an illustrative embodiment. As shown, the plurality of images 701, 702, 703, 704, 705, and 706 (each to be verified as a registered non-fungible token), at block 760, are input into computing system 400. At block 770, the images 700 are normalized by non-fungible token normalizer 456, where characteristics of each of the objects 710 of the images 701, 702, 703, 704, 705, and 706 are found to be the same (shown in block 740). At block 780, non-fungible token search agent 458 utilizes object and characteristic data to perform a search for one or more registered non-fungible token images (such as, for example registered non-fungible token image 700) that are similar to the images 701, 702, 703, 704, 705, and 706 or the normalized version(s) of the images 701, 702, 703, 704, 705, and 706. It is noted that object 710 of registered non-fungible token image 750 is summarized as a formula at block 735.

Based on the search, a registered non-fungible token image 700 is found to be similar to the normalized image(s). At block 790, a verification process is carried out to confirm that registered non-fungible token image 700 is substantially the same as the normalized image(s). At block 760, a formula is presented representing each of the objects 710 of each of the plurality of images 701, 702, 703, 704, 705, and 706; the formula is equivalent to the formula at block 735, showing that the images 701, 702, 703, 704, 705, and 706 are variants of image 750. The verification process can, in embodiments, includes process steps relating to blocks 535 through 555 found in FIG. 5.

Figure 8:
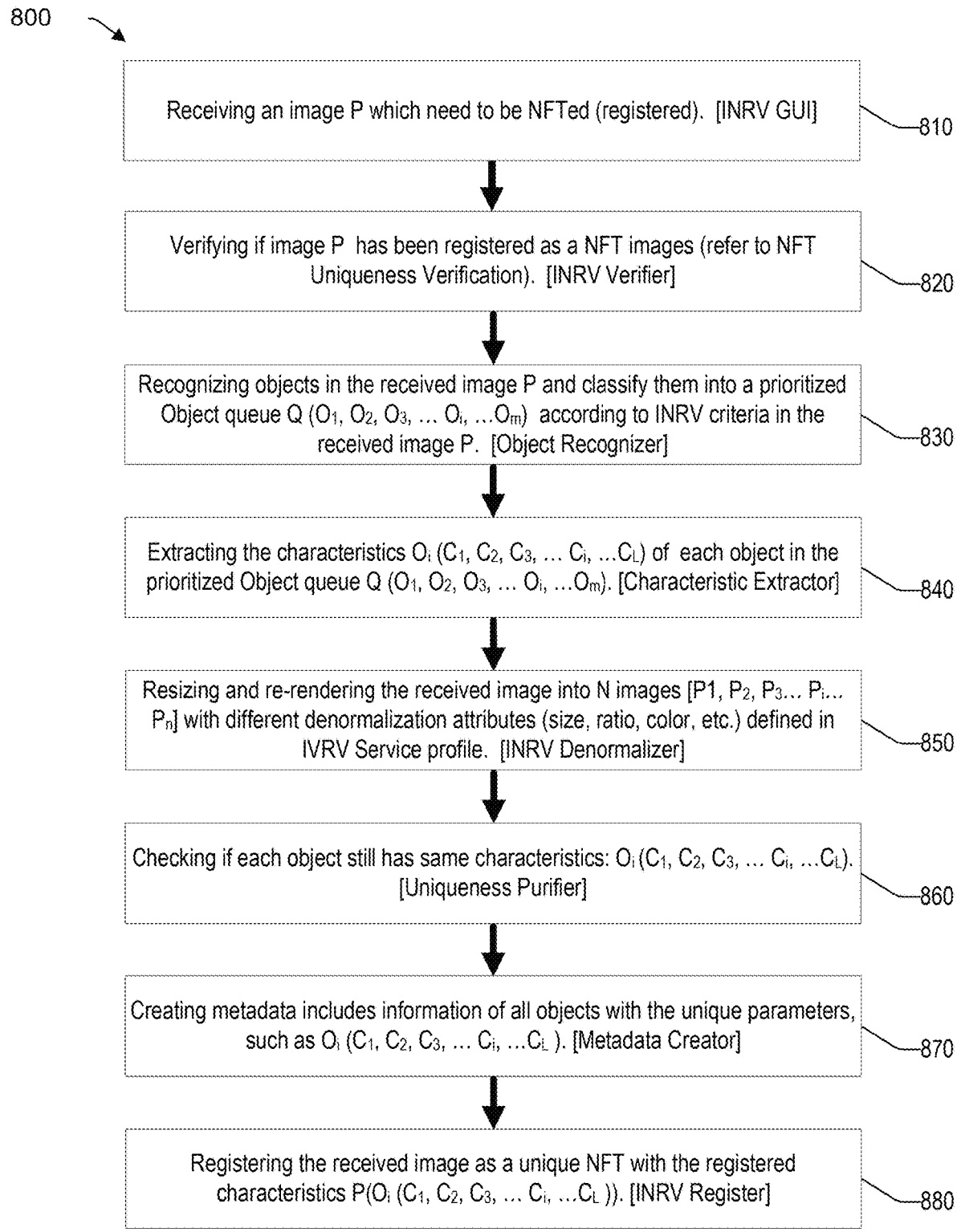
FIG. 8 is a flowchart for a method for registering an image as a non-fungible token image, consistent with an illustrative embodiment.

With the foregoing overview of the example architecture/environment/device 100,400, it may be helpful to consider a high-level discussion of an example process. To that end FIG. 8 presents a flowchart 800 for a method for registering an image as a non-fungible token image, consistent with an illustrative embodiment.

Flowchart 800 is illustrated as a process in logical flowchart format, wherein the flowchart represents a sequence of operations that can be implemented in hardware, software, or a combination thereof. In the context of software, the process represents computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process. For discussion purposes, the registration method is described with reference to the architecture of environment 100 and system 400 of FIGS. 1 and 4. The method is advantageous in that the impact on the service level of the metaverse is very low, which leads to the saving of computational resources.

At block 810, a non-fungible token GUI 440 receives an image (alternatively referred to as Image P) as a non-fungible token image registration request, where the image includes one or more attributes.

At block 820, a non-fungible token verifier 450 verifies that the image has not been registered as a registered non-fungible token image.

At block 830, an object recognizer 450 recognizes one or more objects of the image that are classified into a prioritized object queue O ($O_1$, $O_2$, $O_3$, ... $O_i$, ... $O_m$) according to non-fungible token criteria.

At block 840, a characteristic extractor 462 extracts one or more characteristics $O_i$ ($C_1$, $C_2$, $C_3$, ... $C_i$, ... $C_L$) of at least one of the one or more objects in the prioritized object queue.

At block 850, a non-fungible token denormalizer 470 denormalizes the image into one or more denormalized images [$P_1$, $P_2$ $P_3$ ... $P_i$ ... $P_n$], where each of the one or more denormalized images includes one or more denormalization attributes different than the one or more attributes of the image.

At block 860, the uniqueness purifier 472 inspects one or more objects of each of the one or more denormalized images for the one or more extracted characteristics of at least one of the one or more objects in the prioritized object queue, where characteristics of each of the one or more objects of each of the one or more denormalized images matching the one or more extracted characteristics defines a unique parameter. As an example, if $(P_1[O_1(C_1, C_2, C_3, \ldots C_i, \ldots C_L)]=P_2[O_1(C_1, C_2, C_3, \ldots C_i, \ldots C_L)]=P_3[O_1(C_1, C_2, C_3, \ldots C_i, \ldots C_L)] \ldots ,)$, then the object characteristics can be used as a unique parameter for non-fungible token registration.

At block 870, a metadata creator 474 creates metadata for the image including information relating to each of the one or more objects of the image in the prioritized object queue and each of the one or more objects of the one or more denormalized images in the prioritized object queue having the unique parameter.

At block 880, the image is registered as a unique non-fungible token image on a non-fungible token register 476. The image includes registered characteristics $P(O_i(C_1, C_2, C_3, \ldots C_i, \ldots C_L))$.

In an embodiment, the image is a frame of a video file. In a further embodiment, verifying includes additional process steps. Non-fungible token normalizer 456 normalizes the image. Non-fungible token search agent 458 then searches a registered non-fungible token database for the image, where the non-fungible token search agent 458 does not return any registered non-fungible token images similar to the image. If non-fungible token search agent 458 does not return any registered non-fungible token images similar to the image, the image registration methodology can be carried out using the image.

In a further embodiment, verifying includes additional process steps. A non-fungible token normalizer 456 normalizes the image. A non-fungible token search agent 458 then searches a registered non-fungible token database for the image, where the non-fungible token search agent returns one or more registered non-fungible token images similar to the image. The object recognizer 460 then selects one or more objects of each of the one or more registered non-fungible token images from the registered non-fungible token database, where each of the one or more objects of each of the one or more registered non-fungible token images comprise one or more registered characteristics. The uniqueness purifier 472 then inspects the image for the one or more objects of each of the one or more registered non-fungible token images, where the one or more objects of the image match the one or more objects of at least one of the one or more registered non-fungible token images. The characteristic extractor 462 then extracts one or more characteristics of the one or more objects of the image. The non-fungible token comparison module 464 then compares the one or more extracted characteristics of the one or more objects of the image to each of the one or more registered characteristics of the matched objects of the one or more registered non-fungible token images. The non-fungible token comparison module 464 then confirms the one or more extracted characteristics of the one or more objects of the image as the one or more registered characteristics of the matched objects of the one or more registered non-fungible token images, where the confirming verifies the image as a variant of at least one of the one or more returned non-fungible token images.

In one embodiment, registered non-fungible token database may be non-fungible token chain 442. The denormalizing of the registration method may include alteration of the image with respect to at least one denormalization attribute, where the denormalization attributes include size, compression format, length ratio, width ratio, length and width ratio, color, three-dimensional rotation, or partial blurring. In a further embodiment, any type of retrievable computerized image enhanced methodology may be utilized in order to carry out the denormalizing. In an additional embodiment, the denormalization attributes are stored and defined in INRV service profile 432. The INRV service profile 432, in embodiments, includes all service related configurations and settings. An example includes when and how to enable/disable one, part, or all INRV criteria. An additional example includes redefining new data structures.

In one embodiment, the registration method includes defining a frame for supporting the registration of the image as the non-fungible token image. In an additional embodiment, the frame can include at least one of an INRV manager module 430 (including a graphical user interface), a non-fungible token verification function (where a user can verify if a given image is a non-fungible token or not), or a non-fungible token registration function (where a user can register a new non-fungible token which has never been registered before).

In a further embodiment, the registration method may include defining a data structure for saving and tracking each of the unique parameters. in an additional embodiment, the unique parameters may comprise a set of variables including ImageID, ImageObjectList, and one or more object characteristics. The ImageID variable represents an image identification element. The ImageObjectList variable represents a list of image objects relative to at least one of an image, a denormalized image, or a normalized image. In another embodiment, which can be combined with the previous embodiments, the unique parameters comprise/represent at least one of a number of objects in an image, the types (for example, shapes) of objects (for example, triangle, pentagon, cylinder, etc.), or the characteristics of each objects (for example, coordinates of corners of a triangle having the coordinates C1(x1,y1), C2(x2,y2), C3(x3,y3)).

Reference is now made to FIG. 9, which presents a flowchart for a method for verifying an image as a non-fungible token image, consistent with an illustrative embodiment. Flowchart of method 900 is illustrated as a process in logical flowchart format, wherein the flowchart represents a sequence of operations that can be implemented in hardware, software, or a combination thereof. In the context of software, the process represents computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process. For discussion purposes, the method 900 is described with reference to the architecture of environment 100 and system 400 of FIGS. 1 and 4. The method is advantageous in that the methodology can be applied to the verification of copywritten images.

At block 910, a non-fungible token API 452 and a non-fungible token verification engine 454 receives a request for verification of an image (alternatively referred to as Image P') as a non-fungible token image.

At block 920, a non-fungible token normalizer 456 normalizes the image.

At block 930, a non-fungible token search agent 458 searches a registered non-fungible token database for the image, where the non-fungible token search agent 458 returns one or more registered non-fungible token images similar to the image.

At block 940, an object recognizer 460 selects one or more objects O ($O_1$, $O_2$, $O_3$, ... $O_i$, ... $O_m$) of each of the one or more registered non-fungible token images from the registered non-fungible token database, where each of the one or more objects of each of the one or more registered non-fungible token images comprise one or more registered characteristics $O_i$($C_1$, $C_2$, $C_3$, ... $C_i$, ... $C_L$).

At block 950, a uniqueness purifier 472 inspects the image for the one or more objects of each of the one or more registered non-fungible token images, where the one or more objects O' ($O'_1$, $O'_2$, $O'_3$, ... $O'_i$, ... $O'_m$) of the image match the one or more objects of at least one of the one or more registered non-fungible token images.

At block 960, a characteristic extractor 462 extracts one or more characteristics of the one or more objects of the image.

At block 970, a non-fungible token comparison module 464 compares the one or more extracted characteristics of the one or more objects of the image to each of the one or more registered characteristics of the matched objects of the one or more registered non-fungible token images.

At block 980, a non-fungible token comparison module 464 confirms the one or more extracted characteristics of the one or more objects of the image as the one or more registered characteristics of the matched objects of the one or more registered non-fungible token images. It is noted that the confirming verifies the image as a variant of at least one of the returned non-fungible token images.

In one embodiment, the image is a frame of a video file. In a further embodiment, the registration method includes defining a frame for supporting the verification of the image as the non-fungible token image. The frame, in relation to the verification method, is advantageous in that it provides easy detection of related images. In an additional embodiment, the frame can include at least one of an INRV manager module 430 (including a graphical user interface), a non-fungible token verification function (where a user can verify if a given image is a non-fungible token or not), or a non-fungible token registration function (where a user can register a new non-fungible token which has never been registered before).

With reference to the disclosed embodiments, the methods, computing devices, and computer program products perform a non-fungible token image registration including denormalization of an image and characteristic extraction of characteristics of objects classified into a prioritized object queue of the image and the denormalized images to achieve a very low service level impact on the metaverse, leading to the saving of computational resources. Additionally, the methods, computing devices, and computer program products perform a non-fungible token image verification including normalization of an image and characteristic extraction and comparison of characteristics of objects of the image and search returned non-fungible token images to achieve a methodology applicable to the verification of copywritten images.

With additional reference to the disclosed embodiments, the methods, computing devices, and computer program products perform a non-fungible token image verification including normalization of an image and characteristic extraction and comparison of characteristics of objects of the image and search returned non-fungible token images to achieve a methodology that can be applied to the verification of copywritten images.

It is noted that, in embodiments, in relation to non-fungible token search agent 458, the term "similar" refers to at least one of the following criteria: the number of objects being the same between to compared images (for example, three objects in both images), the types of each object are the same (for example, a triangle, a pentagon, and a cylinder in both images), and the characteristics of each object are the same (for example, the coordinates of corners/ratio of coordinates of corners are the same with respect to each shape found in both images). In other embodiments, in relation to non-fungible token search agent 458, the term "similar" refers to all three of the preceding criteria.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method for registering an image as a non-fungible token image using a non-fungible token graphical user interface; a non-fungible token verifier; an object recognizer including a characteristic extractor; and a non-fungible token denormalizer including a uniqueness purifier, a metadata creator, and a non-fungible token register; the method comprising:
   verifying, by the non-fungible token verifier, that the image has not been registered as a registered non-fungible token image;
   recognizing, via the object recognizer, one or more objects of the image, wherein the one or more objects of the image are classified into a prioritized object queue;
   extracting, via the characteristic extractor, one or more characteristics of at least one of the one or more objects in the prioritized object queue;
   denormalizing, via the non-fungible token denormalizer, the image into one or more denormalized images;
   inspecting, via the uniqueness purifier, one or more objects of each of the one or more denormalized images for the one or more extracted characteristics of at least one of the one or more objects in the prioritized object queue; and
   registering the image as a unique non-fungible token image on the non-fungible token register.

2. The method of claim 1, wherein the image is a frame of a video file.

3. The method of claim 1, wherein the verifying further comprises:
   normalizing, by a non-fungible token normalizer, the image; and
   searching, by a non-fungible token search agent, a registered non-fungible token database for the image,
   wherein the non-fungible token search agent does not return any registered non-fungible token images similar to the image.

4. The method of claim 1, wherein the verifying further comprises:
   normalizing the image, by a non-fungible token normalizer;
   searching, by a non-fungible token search agent, a registered non-fungible token database for the image;

selecting, via the object recognizer, one or more objects of each of one or more registered non-fungible token images from the registered non-fungible token database, wherein each of the one or more objects comprise one or more registered characteristics;

inspecting, via the uniqueness purifier, the image for the one or more objects, wherein the one or more objects of the image match the one or more objects of at least one of the one or more registered non-fungible token images;

extracting, via the characteristic extractor, one or more characteristics of the one or more objects of the image; and comparing, via a non-fungible token comparison module, the one or more extracted characteristics of the one or more objects of the image to each of the one or more registered characteristics of the matched objects of the one or more registered non-fungible token images.

5. The method of claim 1, wherein the denormalizing includes alteration of the image with respect to at least one of size, compression format, length ratio, width ratio, length and width ratio, color, three-dimensional rotation, or partial blurring.

6. The method of claim 1, further comprising creating, via the metadata creator, metadata for the image including information relating to each of the one or more objects of the image in the prioritized object queue and each of the one or more objects of the one or more denormalized images in the prioritized object queue having a unique parameter.

7. The method of claim 6, further comprising defining a data structure for saving and tracking each of the unique parameters.

8. The method of claim 7, wherein the unique parameters comprise a set of variables including an image identification variable, an image object list variable, and one or more object characteristic variables.

9. A method for verifying an image as a non-fungible token image, using a non-fungible token verifier including a non-fungible token application programming interface, a non-fungible token verification engine, a non-fungible token normalizer, and a non-fungible token search agent; an object recognizer including a characteristic extractor and a non-fungible token comparison module; and a non-fungible token denormalizer including a uniqueness purifier; the method comprising:

normalizing the image, by the non-fungible token normalizer;

searching, by the non-fungible token search agent, a registered non-fungible token database for the image;

selecting, via the object recognizer, one or more objects of each of one or more registered non-fungible token images from the registered non-fungible token database, wherein each of the one or more objects comprise one or more registered characteristics;

inspecting, via the uniqueness purifier, the image for the one or more objects, wherein the one or more objects of the image match the one or more objects of at least one of the one or more registered non-fungible token images;

extracting, via the characteristic extractor, one or more characteristics of the one or more objects of the image; and comparing, via the non-fungible token comparison module, the one or more extracted characteristics of the one or more objects of the image to each of the one or more registered characteristics of the matched objects of the one or more registered non-fungible token images.

10. The method of claim 9, wherein the image is a frame of a video file.

11. The method of claim 9, further comprising confirming, via the non-fungible token comparison module, the one or more extracted characteristics of the one or more objects of the image as the one or more registered characteristics of the matched objects of the one or more registered non-fungible token images, wherein the confirming verifies the image as a variant of at least one of the one or more returned non-fungible token images.

12. The method of claim 9, further comprising defining a frame for supporting a verification of the image as the non-fungible token image.

13. A computing system comprising:

a processor;

a network module coupled to the processor to enable communication over a network;

a computer-readable storage device coupled to the processor;

an image non-fungible token registration and verification (INRV) manager module coupled to the network module;

a non-fungible token graphical user interface coupled to the processor;

a non-fungible token verifier coupled to the processor, the non-fungible token verifier including a non-fungible token application programming interface, a non-fungible token verification engine, a non-fungible token normalizer, and a non-fungible token search agent;

an object recognizer coupled to the processor, the object recognizer including a characteristic extractor and a non-fungible token comparison module;

a non-fungible token denormalizer coupled to the processor, the non-fungible token denormalizer including a uniqueness purifier, a metadata creator, and a non-fungible token register; and program instructions stored on the computer-readable storage device for execution by the processor via a memory, wherein execution of the instructions by the processor configures the computing device to perform a registration method comprising:

verifying, by the non-fungible token verifier, that an image has not been registered as a registered non-fungible token image;

recognizing, via the object recognizer, one or more objects of the image, wherein the one or more objects of the image are classified into a prioritized object queue;

extracting, via the characteristic extractor, one or more characteristics of at least one of the one or more objects in the prioritized object queue;

denormalizing, via the non-fungible token denormalizer, the image into one or more denormalized images, wherein each of the one or more denormalized images comprise one or more denormalization attributes different than one or more attributes of the image;

inspecting, via the uniqueness purifier, one or more objects of each of the one or more denormalized images for the one or more extracted characteristics of at least one of the one or more objects in the prioritized object queue, wherein characteristics of each of the one or more objects of each of the one or more denormalized images matching the one or more extracted characteristics defines a unique parameter; and registering the image as a unique non-fungible token image on the non-fungible token register.

14. The computing system of claim 13, wherein the image is a frame of a video file.

15. The computing system of claim 13, wherein the denormalizing includes alteration of the image with respect to at least one of size, compression format, length ratio, width ratio, length and width ratio, color, three-dimensional rotation, or partial blurring.

16. The computing system of claim 13, wherein execution of the instructions by the processor further configures the computing device to perform a verification method comprising:
  normalizing the image, by the non-fungible token normalizer;
  searching, by the non-fungible token search agent, a registered non-fungible token database for the image;
  selecting, via the object recognizer, one or more objects of each of one or more registered non-fungible token images from the registered non-fungible token database, wherein each of the one or more objects comprise one or more registered characteristics;
  inspecting, via the uniqueness purifier, the image for the one or more objects, wherein the one or more objects of the image match the one or more objects of at least one of the one or more registered non-fungible token images;
  extracting, via the characteristic extractor, one or more characteristics of the one or more objects of the image; and
  comparing, via the non-fungible token comparison module, the one or more extracted characteristics of the one or more objects of the image to each of the one or more registered characteristics of the matched objects of the one or more registered non-fungible token images.

17. The computing system of claim 16, further comprising confirming, via the non-fungible token comparison module, the one or more extracted characteristics of the one or more objects of the image as the one or more registered characteristics of the matched objects of the one or more registered non-fungible token images, wherein the confirming verifies the image as a variant of at least one of the one or more returned non-fungible token images.

18. The computing system of claim 13, wherein each of the one or more denormalized images comprise one or more denormalization attributes different than the one or more attributes of the image.

19. The computing system of claim 13, wherein characteristics of each of the one or more objects of each of the one or more denormalized images matching the one or more extracted characteristics defines a unique parameter.

20. The computing system of claim 13, wherein execution of the instructions by the processor further configures the computing device to perform creating, via the metadata creator, metadata for the image including information relating to each of the one or more objects of the image in the prioritized object queue and each of the one or more objects of the one or more denormalized images in the prioritized object queue having a unique parameter.

* * * * *